Oct. 10, 1961 R. T. CHRISTENSEN 3,004,113
HEARING AIDS

Filed Nov. 21, 1955 2 Sheets-Sheet 1

RAYMOND T. CHRISTENSEN
INVENTOR.

BY John J. Pederson
HIS ATTORNEY.

Oct. 10, 1961   R. T. CHRISTENSEN   3,004,113
HEARING AIDS
Filed Nov. 21, 1955   2 Sheets-Sheet 2
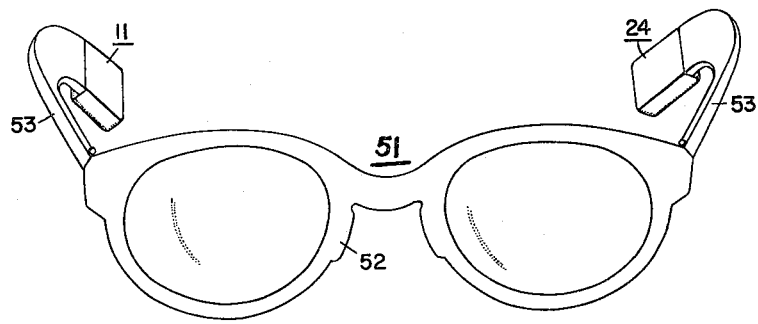
FIG. 5C
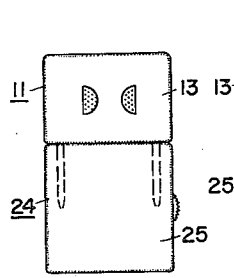 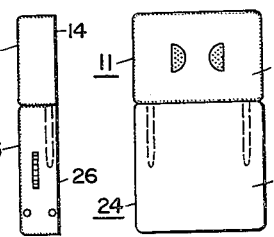 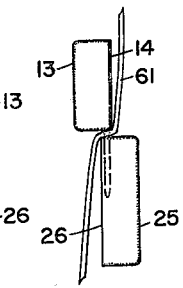 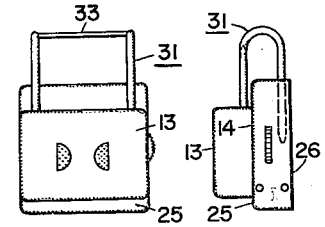
FIG. 6A   FIG. 6B   FIG. 7A   FIG. 7B   FIG. 8A   FIG. 8B
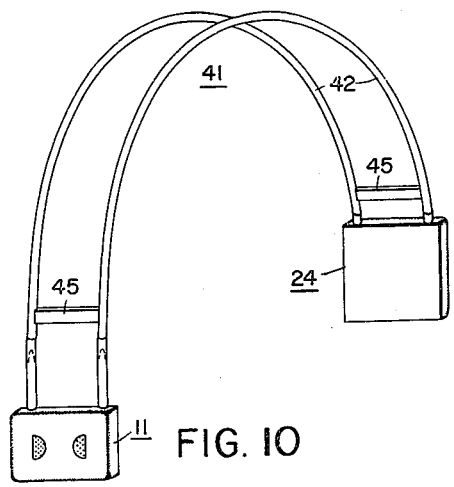
FIG. 10
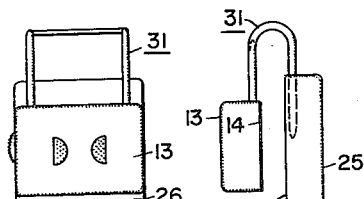
FIG. 9A   FIG. 9B
RAYMOND T. CHRISTENSEN
*INVENTOR.*
BY John J. Pederson
HIS ATTORNEY.

3,004,113
HEARING AIDS
Raymond T. Christensen, Itasca, Ill., assignor to Zenith Radio Corporation, a corporation of Delaware
Filed Nov. 21, 1955, Ser. No. 548,133
4 Claims. (Cl. 179—107)

This invention relates to hearing aids and more particularly to modular hearing aid assemblies formed by joining two or more separate and distinct modules or sub-assemblies.

Generally hearing aid assemblies are of unitary construction; that is, the microphone, amplifier and power supply units are conventionally housed within a single case. In this specification a hearing aid assembly refers to such a conventional collection of units, and may or may not include the ear piece and connecting cord normally coupled to the output terminals of a hearing aid amplifier. Generally the microphone unit is attached to the amplifier unit, and the battery or other power source may be contained within the amplifier section of the assembly. In the manufacture of hearing aids the microphone and amplifier sub-assemblies are often permanently joined one to the other, so that they always present the same appearance and are restricted to use in that particular configuration. On occasion the amplifier and microphone units have been constructed separately with provisions for interconnection of these two sub-assemblies. The connection means provided for such separate sub-assemblies has permitted the affixing of the amplifier and microphone sections in only a single spatial relationship, and such a hearing aid assembly can be used only in the specific form permitted by such connection.

The space savings effected in hearing aid assemblies by the employment of transistor amplifying elements has rendered practical the construction of a hearing aid having small overall dimensions. For example, transistor hearing aids may be constructed in tie pin and barrette forms. However, such miniature instruments have heretofore been separately produced and distributed, so that the ultimate in manufacturing efficiency and versatility have not been achieved; thus, a barrette hearing aid is not suitable to be worn as a tie clip. It is desirable that a single hearing aid assembly incorporate the versatility and flexibility to perform its basic function and simultaneously be capable of use in a variety of forms, each of which has a distinct and separate utility.

It is also known to construct a hearing aid assembly adapted to be worn affixed to a pair of spectacle frames. Such constructions have generally included the usual microphone, amplifier and power source units all housed within the lateral bows of the spectacle frames; even with the advent of transistors and the consequent trend to miniaturization, these configurations have been bulky and conspicuous. Moreover, with such constructions, it is necessary to surrender the spectacle frame when service or repair work on the hearing aid assembly is required, thus depriving the wearer of visual as well as auditory assistance. Also, constructions of this type must be manufactured in a large variety of sizes and styles to accommodate a wide range of individual requirements and preferences, so that standardization techniques in manufacturing and distribution cannot readily be employed.

It is accordingly an object of the invention to provide a new and improved hearing aid assembly which overcomes one or more of the disadvantages of prior art devices.

It is a more specific object of this invention to provide a modular hearing aid assembly formed of separate and distinct modules or sub-assemblies capable of being joined in a variety of spatial relationships to realize a variety of different and disinctly useful forms.

It is another object of this invention to provide a modular hearing aid assembly including a spectacle frame to which the modules or sub-assemblies can be joined in an inconspicuous manner which permits removal of the hearing aid modules without detracting from the spectacle usefulness.

Yet another object of the invention is to provide a combined spectacle-hearing aid device in which the production and distribution of the hearing aid components and the spectacle frames may be individually standardized, with consequent advantages in efficiency and economy.

In accordance with a feature of the invention a hearing aid assembly comprises a microphone unit and an amplifier unit, and a pair of electrically conductive connector elements is eccentrically affixed to one unit. A second pair of electrically conductive connector elements is affixed to the other unit and adapted for mating engagement with the first-mentioned connector elements in a plurality of different orientations. In each orientation the units are electrically and mechanically interconnected in a corresponding predetermined different mutual space relation, in which the hearing aid assembly is adapted to be fastened in a unique fashion to the clothing or to the person of a wearer.

A hearing aid assembly, constructed in accordance with another aspect of the invention, comprises a microphone unit and an amplifier unit, each of which has a median plane. There is a first pair of male connector elements included in one of the units, having a predetermined size, shape and mutual spacing, and disposed substantially parallel but offset with respect to the median plane of the one unit. There is a second pair of female connector elements included in the other unit, disposed substantially parallel to one another, having the same size and spacing as and a shape complementary to that of the first connector elements for mating engagement with the first connector elements to effect both electrical and mechanical interconnection of the units in a plurality of different mutual space relations.

In accordance with another feature of the invention, a hearing aid assembly comprises a spectacle frame including a frontal bridge member and a pair of lateral bow members; conductor means are supported upon the frame and extend along one of the bow members, across the frontal bridge member, and along the other bow member. A hearing aid electrical system includes a microphone, an amplifier, and a power source, assembled in two separate structural units of comparable size. Fastening means are individually associated with the hearing aid units for interchangeably fastening the units to the extremities of the bow members; the fastening means include electrical connector elements for connecting each of the units to the conductor means.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 5b is a partial side view of an element of the adapter shown in FIGURE 5a;

FIGURE 5c is a perspective view useful in understanding the practice of the invention;

FIGURES 6a, 6b, 7a, 7b, 8a, 8b, 9a and 9b are front and side elevational views useful in understanding the practice of the invention; and FIGURE 10 is a perspective view useful in understanding the practice of the invention.

Figure 1A:
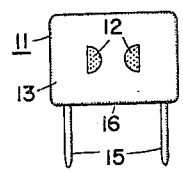
FIGURES 1a and 1b are front and side elevational views of modules constructed in accordance with the invention.
Figure 1B:
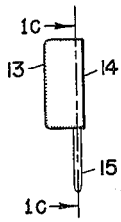

FIGURES 1a and 1b show a microphone module 11 having two semi-circular apertures 12 in a front surface 13 for admitting sound waves to a conventional transducer or microphone (not shown). Microphone module 11 has a rear surface 14, and a pair of electrically conductive connector elements which may be two downwardly extending prongs 15 projecting below a bottom surface 16. Prongs 15 are eccentric with respect to bottom surface 16; that is, prongs 15 are offset from the center-line of the surface below which they extend.

Figure 1C:
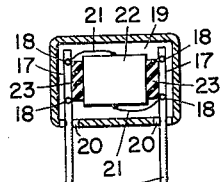
FIGURE 1c is a sectional view taken along the line 1c—1c of FIGURE 1b.

FIGURE 1c shows the upper flattened portions 17 of prongs 15 secured in position by rivets 18 which pass through portions 17 and an insulating sheet 19 of Bakelite or similar material, which in turn is secured to the rear cover of microphone module 11 by suitable fasteners (not shown). A pair of non-conductive washers 20 insulate prongs 15 from the cover of microphone module 11 at the bottom surface of the module. Two conductive leads 21 are connected between the output terminals of microphone 22 and prongs 15. Microphone 22 is supported by vibration isolating spacers 23 positioned between the microphone and upper portions 17 of prongs 15; spacers 23 may be rubber or a similar vibration isolating material. Of course, it will be understood that microphone module 11 may be modified to incorporate auxiliary devices known in the art; for instance, a device senstive to the magnetic fields created adjacent the ear piece of a telephone receiver may be positioned adjacent microphone 22 in microphone module 11, and a switch added to select either the conventional input or the telephone pickup device.

Figure 2A:
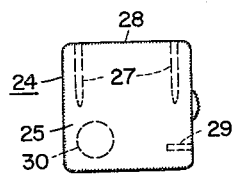
FIGURES 2a and 2b are front and side elevational views of another module constructed in accordance with the invention.
Figure 2B:
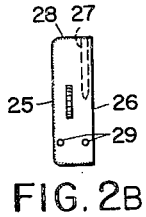

FIGURES 2a and 2b portray an amplifier module 24 which is comparable in size to microphone module 11; as illustrated, amplifier module 24 is somewhat larger than microphone module 11, although the two units may be of identical size and external configuration if desired. Amplifier module 24 has a front surface 25 and a rear surface 26. A pair of electrically conductive connector elements which may take the form of two prong-shaped receptacles 27 are provided in the upper rear section of amplifier module 24, and receptacles 27 are spaced and shaped for mating engagement with prongs 15 of microphone module 11. Receptacles 27 are eccentrically disposed relative to a top surface 28 of amplifier module 24. Receptacles 27 are connected to the input terminals of the amplifying means (not shown) housed in amplifier 24, which means may be any structure known in the art, but preferably employing transistors as the amplifying elements. An appropriate power source such as a miniature battery 30, which may be a mercury cell or the like, is also contained within amplifier module 24. Two smaller cylindrical receptacles 29 are positioned in a side surface of amplifier module 24, and are connected to the output terminals of the amplifier means. Receptacles 29 are provided for mating engagement with connectors leading to an ear piece (not shown), normally employed in conjunction with a hearing aid assembly. Prongs 15 of microphone module 11 and receptacles 27 of amplifier module 24 may be co-axial connectors, but the construction illustrated in the drawings is superior in mechanical rigidity to a co-axial construction.

Figure 3A:
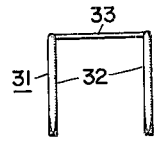
FIGURES 3a and 3b are front and side elevational views of a modular adapter for use with the modules of FIGURES 1a–2b.
Figure 3B:
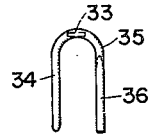

FIGURES 3a and 3b depict a modular adapter 31 comprising two electrically conductive U-shaped legs 32 separated by a rectangular insulating spacer 33. Each leg 32 comprises a front portion 34 and a rear portion 35. Front portions 34 are sized for mating engagement with receptacles 27 of amplifier module 24; rear portions 35 are thicker than prongs 15 of microphone module 11, and are provided with two receptacles 36 suitable for receiving and engaging prongs 15 of microphone module 11.

Figure 4:
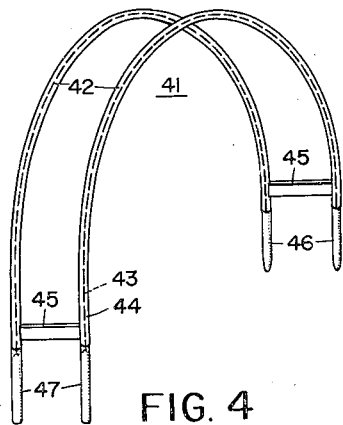
FIGURE 4 is a perspective view of another modular adapter for use with modules of FIGURES 1a–2b.

In FIGURE 4 a modular head set adapter 41 is shown. Adapter 41 comprises two resilient semi-circular leads 42, each lead including an inner conductor 43 and an outer insulating coating 44. Two spacer bars 45 separate leads 42, but spacer bars 45, as will be shown hereinafter, are not requisite in this construction. At one end of adapter 41, inner conductor 43 on each lead 42 is connected to a prong 46, identical to prongs 15 of microphone module 11. At the other end of modular adapter 41 inner conductors 43 are terminated in receptacles 47, identical to receptacles 27 of amplifier module 24.

Figure 5A:
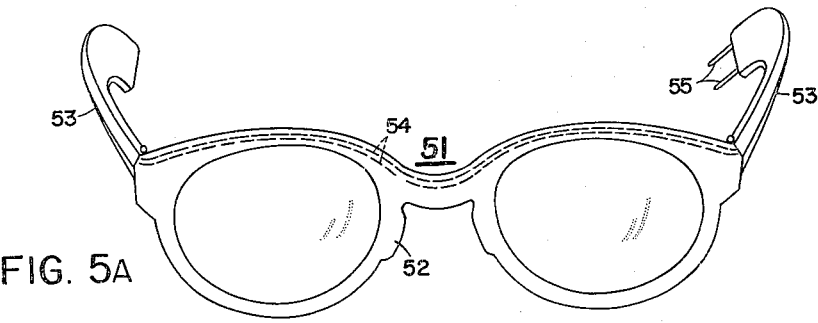
FIGURE 5a is a perspective view of yet another modular adapter for use with the modules of FIGURES 1a–2b.
Figure 5B:

FIGURES 5a, 5b, and 5c show another modular adapter 51 constructed in the form of a spectacle frame. The adapter 51 comprises a frontal bridge member 52 and two lateral bow members 53. As shown in FIGURE 5a, two conductive leads 54 are supported on and preferably enclosed within the upper portion of bridge 52 and are adapted for connection to similar conductive leads supported on or enclosed within bows 53 when the bows are opened to permit the spectacle frame to be placed on the wearer's head. The leads in the bridge member may be connected to those in the bows through segmented hinges (not shown) or in any other suitable manner. Two removable prong-like conductors 55 extend from the extremity of one bow in FIGURE 5a; the construction of connectors 55 is shown more clearly in FIGURE 5b, which also shows the portion of a bow 53 farthest from the spectacle bridge 52. Two conductive leads 54 are supported on and preferably enclosed within the bow, and are connected to two receptacles 56 in the end of the bow. Receptacles 56 are identical in size and configuration to receptacles 27 of amplifier module 24, shown in FIGURES 2a and 2b. Connectors 55 have a central projection 57, and each terminal portion of connector 55 is identical in size and configuration to prongs 15 of microphone module 11. Connectors 55 may be removed from receptacles 56 of one bow, and inserted in the corresponding receptacles of the opposite bow.

The functional aspects of the invention are best described in connection with FIGURES 5c–10. FIGURE 5c shows a modular hearing aid assembly formed by joining microphone module 11 and amplifier module 24 to the extremities of bows 53 of adapter 51. The prongs of microphone module 11 are inserted directly into corresponding receptacles 56 (FIGURE 5b) of one bow, and connectors 55 are utilized to connect amplifier module 24 to the opposite bow (FIGURE 5c). In such a hearing aid assembly the amplifier and microphone modules are at least partially concealed behind the ears of the wearer, and are not obvious to a viewer looking directly at the hearing aid wearer. Moreover, the wearer cannot see the microphone or amplifier module, and therefore is not constantly reminded of his own hearing deficiency.

Moreover, with an arrangement of this type in accordance with the invention, microphone module 11 and amplifier module 24 may be worn appended to either spectacle bow. Connectors 55 may be removed from the extremity of either bow (FIGURE 5b) and inserted in the opposite bow, thus permitting connection of amplifier module 24 to that bow; microphone module 11 may be connected to receptacles 56 of the opposite bow. Thus the construction of the spectacle frames and the hearing aid units may be individually standardized, resulting in a substantial saving of labor and materials. Additionally, an individual with compensable deficiencies in both ears may wish to periodically alternate the microphone and amplifier units, either for personal comfort or to accommodate varying conditions of environment. For instance, when driving to work with the left front window of an automobile open, it is apparent that sounds directed from the left side of the wearer are of primary importance; while at work, the wearer may be situated so that his co-workers normally address him from his right side. In such instances, a simple transposition of microphone and amplifier units derives maximum utility from the instrument. Moreover, the microphone module, amplifier module, and connector pins 55 can be readily removed from spectacle bows 53 for service or repairs without depriving the user of his visual aid. In this embodiment of the invention, it may be especially desirable to house the amplifier and microphone modules in cases of identical size and external configuration, for purposes of symmetry.

FIGURES 6a and 6b show a modular hearing aid formed by inserting prongs 15 of microphone module 11 into receptacles 27 of amplifier module 24, so that front surface 13 of microphone module 11 is flush with front surface 25 of amplifier module 24, and rear surfaces 14 and 26 of the two modules are also flush with respect to each other; this is a frequently used hearing aid configuration. Amplifier module 24 may be inserted into a small pocket, such as a vest pocket, so that microphone module 11 extends upwardly above the pocket if desired for receiving sound waves. Alternatively, conventional clothing clips (not shown) may be affixed to amplifier module 24 for securing the module to a shirt pocket or the like.

FIGURES 7a and 7b depict a modular hearing aid formed by inserting prongs 15 of microphone module 11 into receptacles 27 of amplifier module 24, to form a modular hearing aid in which front surface 13 of microphone module 11 and front surface 25 of amplifier module 24 are oppositely directed. The rear surfaces of the two modules are parallel to and substantially flush with each other, being separated only by the thickness of receptacles 27. Such a spatial relation between the two modules enables the assembly to be used as a "stick-pin" type hearing aid, as for instance, one inserted through and supported by the necktie 61 or the like of the wearer.

The sense of the mechanical and electrical interconnections between prongs 15 and receptacles 27 is reversed as modules 11 and 24 are disassembled from the configuration shown in FIGURES 6a and 6b and reassembled in the form shown in FIGURES 7a and 7b. To permit the modules to be interconnected in either of two senses, prongs 15 of the microphone unit are insulated from the cover of microphone module 11, as described in connection with FIGURE 1c. In this manner, the microphone unit is rendered electrically symmetrical, with no self-contained ground reference, to provide efficient signal translation to the amplifier unit in either assembled condition. Alternatively, receptacles 27 may be insulated from the amplifier unit for this purpose, if desired.

FIGURES 8a and 8b show still another configuration of a modular hearing aid, formed by using adapter 31 as a modular connector between microphone module 11 and amplifier module 24. The use of vacuum tubes, which have high input impedances, in the hearing aid amplifier limits the length of the connectors which can be utilized to interconnect the microphone and amplifier without facilitating the pickup and amplification of undesirable, extraneous hum; however, the relatively low input impedance of transistors, as compared with vacuum tubes, obviates this difficulty. Front portions 34 of modular adapter 31 are inserted into receptacles 27 of amplifier module 24, and rear portions 35 of modular adapter 31 are disposed in front of amplifier module 24. Prongs 15 of microphone module 11 are inserted into receptacles 36 of modular adapter 31, forming a modular hearing aid which finds utility, for example, as a tie-clip. A necktie or other material may be secured between rear surface 14 of microphone module 11 and front surface 25 of amplifier module 24. Spacer bar 33 facilitates connection of microphone module 11 and amplifier module 24 with modular adapter 31, by maintaining U-shaped legs 32 at the correct separation to receive prongs 15 and engage receptacles 27; however, spacer bar 33 is not necessary to the construction shown in FIGURES 8a and 8b, and may be omitted.

In FIGURES 9a and 9b another modular hearing aid formation including modular adapter 31 is shown, and the construction shown in FIGURES 9a and 9b differs from that of FIGURES 8a and 8b in that the position of amplifier module 24 has been reversed. The orientation of microphone module 11 and amplifier module 24 shown in FIGURES 9a and 9b provides access to the substantial width of the U-shaped bends of legs 32 of modular adapter 31; this orientation enables the hearing aid assembly to be clipped to a belt or other wearing apparel of appreciable thickness.

FIGURE 10 shows a modular hearing aid formed by connection of modular adapter 41 between microphone module 11 and amplifier module 24. Prongs 15 of microphone module 11 are inserted in receptacles 47 of modular adapter 41, and prongs 46 of modular adapter 41 are inserted into receptacles 27 of amplifier module 24. It is evident that spacer bars 45 are not necessary to this construction, but facilitate engagement of the modular adapter with the microphone and amplifier modules. The form of the assembly shown in FIGURE 10 enables the hearing aid to be worn on the head, and adapter 41 can be shifted through 180° so that the microphone and amplifier modules may be positioned on either side of the head. Feedback problems are minimized by placing the amplifier and microphone modules on opposite sides of the wearer's head.

The invention provides a modular hearing aid comprising separate modules adapted to be joined in a variety of different orientations, in each of which the resulting modular hearing aid is adapted to be fastened to the clothing or to the person of the wearer in a manner distinct and separate from the other orientations. By assembling the standard modules in different manners, hearing deficiencies in either ear may be compensated, and the instrument may be readily adapted to any desired form of attachment to the person or clothing of the user. In one embodiment, the hearing aid assembly may be inconspicuously combined with a pair of spectacle frames in a manner permitting independent servicing and repair when required without depriving the user of the use of his eyeglasses. Moreover, this increased versatility is achieved while retaining the material economic and other advantages of standardization in production and distribution.

While particular embodiments of the invention have been shown and described, it is apparent that modifications and alterations may be made, and it is intended in the appended claims to cover all such modifications and alterations as may fall within the true spirit and scope of the invention.

I claim:

1. A hearing aid assembly comprising: a microphone unit having a median plane; an amplifier unit having a median plane; a first pair of male connector elements included in one of said units, having a predetermined size, shape and mutual spacing, and disposed substantially parallel but off set with respect to the median plane of said one unit; and a second pair of female connector elements included in the other of said units, disposed substantially parallel to one another, having the same size and spacing as and a shape complementary to that of said first connector elements for mating engagement with said first connector elements to effect both electrical and mechanical interconnection of said units in a plurality of different mutual space relations.

2. A hearing aid assembly comprising: a microphone unit having a median plane and including a first pair of male connector elements having a predetermined size, shape and mutual spacing, disposed substantially parallel but off set with respect to said median plane; and an amplifier unit having a median plane and including a second pair of female connector elements disposed substantially parallel but off set with respect to said median plane, having the same size and spacing as and a shape complementary to that of said first connector elements for mating engagement with said first connector elements to effect both electrical and mechanical interconnection of said units in a plurality of different mutual space relations.

3. A hearing aid assembly comprising: a microphone unit having a median plane; an amplifier unit having a median plane; a first pair of male connector elements included in one of said units, having a predetermined size, shape and mutual spacing, and disposed substantially parallel but off set with respect to the median plane of said one unit; a second pair of female connector elements included in the other of said units, disposed substantially parallel to one another, having the same size and spacing as and a shape complementary to that of said first connector elements; and an adapter including third and fourth pairs of connectors similar in size and spacing and having a shape complementary to said first and second pairs of connector elements respectively, to effect both electrical and mechanical interconnection of said units in a plurality of different mutual space relations.

4. A hearing aid assembly comprising: a microphone unit enclosed within a first electrically conductive case having a median plane; an amplifier unit enclosed within a second electrically conductive case having a median plane; a first pair of male connector elements included in one of said units and electrically insulated from its conductive case, having a predetermined size, shape and mutual spacing, and disposed substantially parallel but off set with respect to the median plane of said one unit; and a second pair of female connector elements included in the other of said units and electrically insulated from its conductive case, disposed substantially parallel to one another, having the same size and spacing as and a shape complementary to that of said first connector elements for mating engagement with said first connector elements to effect both electrical and mechanical interconnection of said units in a plurality of different mutual space relations.

References Cited in the file of this patent
UNITED STATES PATENTS

| | | |
|---|---|---|
| 1,811,639 | Lieber | June 23, 1931 |
| 2,613,282 | Scaife | Sept. 8, 1949 |
| 2,794,085 | De Angelis | May 28, 1957 |
| 2,874,230 | Carlson | Feb. 17, 1959 |

FOREIGN PATENTS

| | | |
|---|---|---|
| 679,303 | Great Britain | Sept. 17, 1952 |

OTHER REFERENCES

Dictograph publication 1940, "Acousticon Carbon and Vacuum Tube Models," 16 pages, page 6.